(12) United States Patent
Johnson et al.

(10) Patent No.: US 8,643,968 B2
(45) Date of Patent: Feb. 4, 2014

(54) METHODS AND SYSTEMS FOR MAGNETIC MEDIA SERVO WRITING

(71) Applicant: Imation Corp., Oakdale, MN (US)

(72) Inventors: Douglas W. Johnson, Stillwater, MN (US); Roni J. Dornfeld, Hugo, MN (US); Stephen J. Rothermel, Roseville, MN (US)

(73) Assignee: Imation Corp., Oakdale, MN (US)

( * ) Notice: Subject to any disclaimer, the term of this patent is extended or adjusted under 35 U.S.C. 154(b) by 0 days.

(21) Appl. No.: 13/795,668

(22) Filed: Mar. 12, 2013

(65) Prior Publication Data
US 2013/0286501 A1  Oct. 31, 2013

Related U.S. Application Data

(60) Provisional application No. 61/638,767, filed on Apr. 26, 2012.

(51) Int. Cl.
*G11B 27/36* (2006.01)

(52) U.S. Cl.
USPC .......................................................... 360/31

(58) Field of Classification Search
None
See application file for complete search history.

(56) References Cited

U.S. PATENT DOCUMENTS

| | | |
|---|---|---|
| 4,493,779 A | 1/1985 | Kamiyama |
| 4,493,874 A | 1/1985 | Kubo et al. |
| 4,672,009 A | 6/1987 | Takahashi |
| 4,690,768 A | 9/1987 | Kamiyama |
| 4,975,791 A | 12/1990 | Eggebeen |
| 5,247,397 A | 9/1993 | Sato et al. |
| 5,572,392 A | 11/1996 | Aboaf et al. |
| 5,689,384 A | 11/1997 | Albrecht et al. |
| 6,021,013 A | 2/2000 | Albrecht et al. |
| 6,040,964 A | 3/2000 | Saliba |
| 6,282,051 B1 | 8/2001 | Albrecht et al. |
| 6,462,904 B1 | 10/2002 | Albrecht et al. |
| 6,542,325 B1 | 4/2003 | Molstad et al. |
| 6,647,613 B2 | 11/2003 | Beck et al. |
| 6,781,778 B1 | 8/2004 | Molstad et al. |
| 6,807,025 B1 | 10/2004 | Benakli et al. |
| 6,842,305 B2 | 1/2005 | Molstad et al. |
| 6,943,987 B1 | 9/2005 | Raymond et al. |

(Continued)

FOREIGN PATENT DOCUMENTS

| | | |
|---|---|---|
| GB | 812 023 A | 4/1959 |
| JP | 1208712 A | 8/1989 |
| JP | 2009-020943 A | 1/2009 |
| SU | 1631598 A1 | 2/1991 |

OTHER PUBLICATIONS

Kryder, Mark H. "An Introduction to Magnetic Recording Heads," in: Hadjipanayis, George C., ed., *Magnetic Storage Systems Beyond 2000*, NATO Science Series, vol. 41, Netherlands, Kluwer Academic Publishers, 2001, pp. 449-466.

(Continued)

*Primary Examiner* — Paul Huber
(74) *Attorney, Agent, or Firm* — Dorsey & Whitney LLP

(57) ABSTRACT

A method comprises generating first and second magnetic field components in a magnetic medium, the second magnetic field component substantially opposite the first. A pattern is written onto the magnetic medium, and a signal is generated by reading the pattern. The magnitude of the second magnetic field component is controlled based on an asymmetry of the signal.

20 Claims, 4 Drawing Sheets

(56) References Cited

U.S. PATENT DOCUMENTS

| | | |
|---|---|---|
| 6,950,269 B1 | 9/2005 | Johnson |
| 7,002,763 B2 | 2/2006 | Bui et al. |
| 7,012,774 B2 | 3/2006 | Nakao et al. |
| 7,050,251 B2 | 5/2006 | Lundstrom |
| 7,132,164 B2 | 11/2006 | Yamazaki et al. |
| 7,206,167 B2 | 4/2007 | Beck et al. |
| 7,224,544 B2 | 5/2007 | Takano et al. |
| 7,381,482 B2 | 6/2008 | Yamazaki et al. |
| 7,515,374 B2 | 4/2009 | Nakao |
| 7,551,380 B2 | 6/2009 | Watson et al. |
| 7,623,310 B2 | 11/2009 | Nakao |
| 7,864,487 B2 | 1/2011 | Cherubini et al. |
| 7,986,485 B2 | 7/2011 | Mckinstry et al. |
| 8,014,100 B2 | 9/2011 | Biskeborn et al. |
| 8,254,052 B2 | 8/2012 | Dugas |
| 2003/0095353 A1 | 5/2003 | Nakao |
| 2003/0099059 A1* | 5/2003 | Nakao ............... 360/77.12 |
| 2005/0099718 A1 | 5/2005 | Takano et al. |
| 2005/0254170 A1 | 11/2005 | Dugas et al. |
| 2006/0126207 A1 | 6/2006 | Johnson et al. |
| 2006/0177702 A1 | 8/2006 | Ajan |
| 2008/0024905 A1 | 1/2008 | Johnson et al. |
| 2008/0049356 A1 | 2/2008 | Weber et al. |
| 2008/0158721 A1* | 7/2008 | Bui et al. ............ 360/77.12 |
| 2008/0304180 A1 | 12/2008 | Schaefer et al. |
| 2009/0046396 A1 | 2/2009 | Nagata et al. |
| 2009/0080108 A1 | 3/2009 | Watson et al. |
| 2010/0246057 A1 | 9/2010 | Mckinstry et al. |
| 2012/0019954 A1 | 1/2012 | Imaino et al. |
| 2012/0050908 A1 | 3/2012 | Ohtsu et al. |
| 2012/0314318 A1 | 12/2012 | Olson et al. |
| 2012/0314319 A1 | 12/2012 | Olson et al. |
| 2012/0314320 A1 | 12/2012 | Olson et al. |
| 2012/0314322 A1 | 12/2012 | Olson et al. |

OTHER PUBLICATIONS

Cherubini, Giovanni, et al. "29.5-Gb/in$^2$ Recording Areal Density on Barium Ferrite Tape," *IEEE Transactions on Magnetics*, vol. 47, No. 1, pp. 137-147, Jan. 2011.

International Search Report dated Apr. 25, 2013, for PCT Application No. PCT/US2013/023816 filed Jan. 30, 2013.

International Search Report dated Aug. 13, 2012, for PCT Application No. PCT/US2012/042094 filed Jun. 12, 2012.

U.S. Appl. No. 13/795,482, filed Mar. 12, 2013, entitled "Tapered Pole Heads for Magnetic Media".

U.S. Appl. No. 13/795,421, filed Mar. 12, 2013, entitled "Systems and Methods for Processing Magnetic Media".

U.S. Appl. No. 13/795,590, filed Mar. 12, 2013, entitled "Servo Write Head".

U.S. Appl. No. 13/754,078, filed Jan. 30, 2013, entitled "Perpendicular Pole Head for Servo Writing Magnetic Media".

* cited by examiner

METHODS AND SYSTEMS FOR MAGNETIC MEDIA SERVO WRITING

RELATED U.S. APPLICATION DATA

This application claims priority to U.S. provisional Application No. 61/638,767, filed Apr. 26, 2012, and incorporated herein by reference.

The subject matter of this application is also related to that of the following applications, each of which is incorporated by reference in its entirety for all purposes: U.S. non-provisional application Ser. No. 13/795,421, entitled "METHODS AND SYSTEMS FOR PROCESSING MAGNETIC MEDIA", filed on even date herewith, which claims priority to U.S. provisional Application No. 61/638,832, filed Apr. 26, 2012; U.S. non-provisional application Ser. No. 13/795,482, entitled "TAPERED POLE HEADS FOR MAGNETIC MEDIA", filed on even date herewith, which claims priority to U.S. provisional Application No. 61/638,820, filed Apr. 26, 2012; U.S. non-provisional application Ser. No. 13/795,590, entitled "SERVO WRITE HEAD", filed on even date herewith, which claims priority to U.S. provisional Application No. 61/638,806, filed Apr. 26, 2012; and U.S. non-provisional application Ser. No, 13/754,078, entitled "PERPENDICULAR POLE HEAD FOR SERVO WRITING MAGNETIC MEDIA", filed Jan. 30, 2013, which claims priority to U.S. provisional Application No. 61/620,199, filed Apr. 4, 2012.

BACKGROUND

Magnetic tape-based data storage systems provide secure, reliable, cost-efficient, and scalable data storage solutions for business, industry, and government service applications. Cartridge-based magnetic tape systems combine efficiency and ease of use in regulated bulk storage environments, and are adaptable for use with online, nearline, offline, and offsite infrastructures to relay large datasets, ensure regulatory compliance and safeguard critical information while lowering data storage costs and service time.

Magnetic tape systems provide high data storage densities and capacity, with adaptable performance criteria suitable for a wide range of backup, archiving, and portable data storage needs. As storage densities and access speeds increase, however, substantial engineering demands are made on the servo system, which must provide precise head positioning capability in order to quickly, accurately, and reliably read and write data to and from the data storage medium.

The storage medium itself is typically divided into alternating data storage and servo bands. Servo patterns are recorded onto the servo bands during the formatting or manufacturing process, and used to position the data heads during read and write operations. The servo control system uses servo heads to read the servo patterns, and performs a time-based pattern conversion to determine position. Based on the servo signal, the data heads can be precisely positioned along particular data tracks, as defined between adjacent servo bands.

Representative servo pattern and head positioning technologies are described in the following U.S. patent documents, each of which is incorporated by reference herein: Molstad et al., U.S. Pat. No. 6,542,325, TIME-BASED SERVO FOR MAGNETIC STORAGE MEDIA, issued Apr. 1, 2003, and assigned to Imation Corp. of Oakdale, Minn.; Molstad et al., U.S. Pat. No. 6,781,778, TIME-BASED SECTORED SERVO DATA FORMAT, issued Aug. 24, 2004, and assigned to Imation Corp. of Oakdale, Minn.; and Johnson et al., U.S. Pat. No. 6,950,269, SYSTEM AND METHODS FOR USING SERVO POSITIONING SIGNALS, issued Sep. 17, 2005, and assigned to Imation Corp. of Oakdale, Minn. These servo pattern formation technologies and head positioning algorithms allow for narrower data track definitions along the data bands, and provide for more precise data head positioning over individual data tracks. As a result, data density and read/write reliability are increased.

To further improve performance, the magnetic medium may be erased (or degaussed) before writing the servo pattern. Depending on technique, degaussing can provide the magnetic medium with a more homogeneous or isotropic domain structure, improving read and write capability for both the servo patterns and data tracks. Erasure and degaussing techniques thus impact overall performance, particularly in high capacity magnetic media with increased data rates and storage density.

SUMMARY

Exemplary embodiments of the present disclosure include methods and systems for processing magnetic media. Exemplary methods may include generating substantially opposite field components in a magnetic medium, including at least first and second fields; writing a pattern onto the magnetic medium; and generating a signal by reading the pattern. Exemplary methods may also include determining an asymmetry of the signal, and controlling a magnitude of the second field component based on the asymmetry.

Exemplary systems may include magnetic heads, including at least first and second magnetic heads, positioned along a magnetic medium, where the heads are configured to generate substantially opposite field components (including at least first and second substantially opposite field components), along with heads configured to write a pattern onto the magnetic medium, and to generate a signal by reading the pattern. Exemplary systems may also include a controller connected to the read head and the second magnetic head, where the controller is configured to determine an asymmetry of the signal and to control a magnitude of the second field component based on the asymmetry.

In the exemplary systems and methods, the magnetic medium may be configured for perpendicular recording and the magnitude of the second field component may be adjusted to reduce or minimize perpendicular bias in the magnetic medium. While exemplary systems and methods may be configured for perpendicular recording and may have the magnitude of the second field component adjusted to reduce or minimize perpendicular bias, in the context of the invention there is no particular requirement for any such limitation. For example, in some embodiments it may be desirable to have both strong perpendicular and longitudinal components. In the exemplary systems and methods, the magnitude of the second field component may be adjusted to reduce or minimize asymmetry in a servo signal.

DETAILED DESCRIPTION

Figure 1:
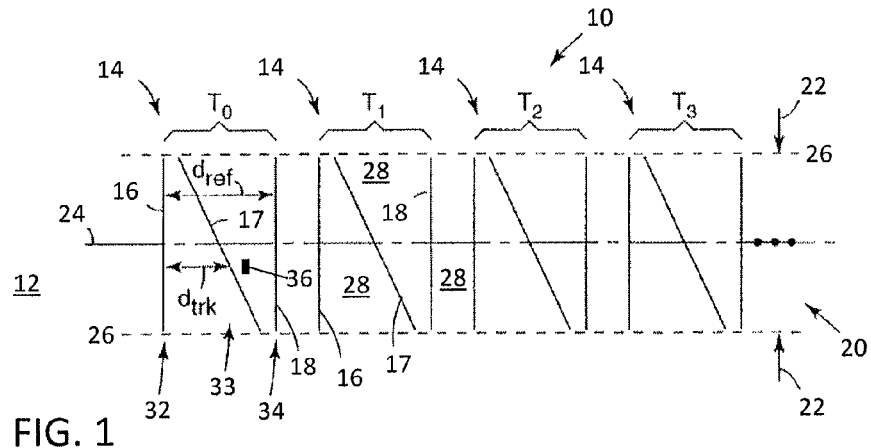
FIG. 1 is schematic illustration of a servo pattern in a magnetic recording medium, with reduced bias.

FIG. 1 is schematic illustration of servo data pattern 10 on magnetic recording medium 12. Magnetic recording medium 12 is shown in a top-down view, looking toward the magnetic storage surface. Servo pattern 10 is represented by repeated sets or frames 14 of servo pattern lines, for example three lines 16, 17, and 18 in an N-shaped pattern. A series of frames 14 are distributed along servo band (or track) 20, each with substantially identical pattern lines 16, 17, and 18, forming pattern 10 on magnetic medium 12.

Width 22 of band 20 is defined generally perpendicularly (or generally orthogonally) to center line 24 of pattern 10, between lateral edges or sides 26 (dashed lines). Sides 26 define the lateral boundaries of pattern lines 16, 17, and 18 in each frame 14.

To reduce bias and improve signal performance, the magnetic domain structure may be substantially randomized in inter-pattern regions 28, between pattern lines 16, 17, and 18, and between individual frames 14. Reduced bias in magnetic medium 12 reduces asymmetry in the servo and data signals, improving system performance.

Magnetic medium 12 is typically formed by binding a magnetic coating to a substrate or base film, for example a polymer such as polyethylene terephthalate (PET) or polyethylene naphthalate (PEN). A back coat may be applied to the surface opposite the magnetic coating, for example silicon dioxide or carbon black pigment particles (or both), in a blend of polymer resin or nitrocellulose binders to provide stiffness, reduce friction, dissipate static charge, and maintain uniform tape wind.

Typical magnetic coatings include magnetic particles or a magnetic powder in a binder such as a thermoplastic resin. The magnetic coating may also include a head cleaning agent (HCA) such as an alumina or aluminum oxide pigment particles, abrasive grains such as silica, or both, along with other resin or binder components such as surfactants, lubricants, and hardeners.

In the particular example of FIG. 1, magnetic medium 12 is configured for perpendicular recording, for example using a barium ferrite (BaFe) or other perpendicularly oriented magnetic recording layer with a soft magnetic underlayer (SUL) for flux return. Other materials may also be suitable, such as strontium ferrite (SrFe) or cobalt ferrite (CoFe), or a combination of one or more ferrite, ferromagnetic (FM), anti-ferromagnetic (AFM), synthetic anti-ferromagnetic (SAF) and soft underlayer materials, forming a layered perpendicular magnetic recording material.

Depending on application, servo pattern 10 may extend continuously along substantially the entire length of magnetic medium 12. Alternatively, pattern 10 may be provided in particular track sectors, for example at the beginning and end of magnetic (tape) medium 12, or in periodic locations along magnetic medium 12. In some applications, pattern 10 can be provided on non-tape-based magnetic media 12, for example a magnetic disc.

Pattern 10 may also represent more generalized data in a data band 20, for example generic binary data stored in either a perpendicular or longitudinal recording medium, such as a magnetic tape or a magnetic disc, or analog data on an analog medium. In these applications, reduced bias in magnetic medium 12 also reduces asymmetry in the signal from the data head (or read/write head), further improving system performance by increasing speed and reliability for data read and write operations.

Servo pattern lines 16, 17, and 18 can be simultaneously recorded in each servo frame 14 to reduce sensitivity to recording speed. For example, pattern lines 16, 17, and 18 in individual servo frames 14 may be written at times $t_0$, $t_1$, $t_2$, etc., as shown in FIG. 1. Thus, the geometry and relative positions of servo pattern lines 16, 17, and 18 can be substantially identical in each servo frame 14, spaced along magnetic medium 12 according to frame recording times $t_0$, $t_1$, $t_2$, etc. The frame recording times themselves may be periodic, or aperiodic.

As shown in FIG. 1, individual servo frames 14 each include three servo lines 16, 17, and 18, forming an "N" pattern. Reference lines 16 and 18 are recorded in first and second servo pattern reference regions 32 and 34, respectively, extending transversely or substantially perpendicularly to center line 24. Servo pattern line 17 extends diagonally across servo pattern region 33 at a skew angle with respect to center line 24, between first reference region 32 and second reference region 34. Servo pattern line 17 also makes a skew angle with respect to reference lines 16 and 18, forming the "N" shaped pattern ("|\ |") of each servo frame 14.

Servo patterns 10 are written to magnetic medium 12 during the manufacturing or formatting process, and are used as a reference to position the data heads for reading and writing to data tracks over the life of the tape cartridge or other magnetic storage device. As magnetic medium 12 translates along center line 24 of servo band 20, read head 36 crosses a series of magnetic transitions at the leading and trailing edges of pattern lines 16, 17, and 18, generating a corresponding series of servo signals or servo read pulses.

Servo signal timing depends on the relative position and magnetic polarization states of servo pattern lines 16, 17, and 18. As shown in FIG. 1, reference lines 16 and 18 define reference distance $d_{ref}$, which is constant across width 22 of servo band 20. Servo pattern line 17 defines tracking distance $d_{trk}$, which varies across width 22 of servo band 20.

The servo read pulses are defined by time intervals corresponding to reference distance $d_{ref}$ and tracking distance $d_{trk}$. The time intervals are used to generate a position signal for read head 36, based on the ratio $d_{trk}/d_{ref}$. As shown FIG. 1, for example, a lower ratio indicates a position toward the top of servo band 20, and a higher ratio indicates a position toward the bottom of servo band 20. The servo signals are used to position read/write (data) heads along data tracks in the data bands, extending between adjacent servo bands 20.

The servo pattern can be reversed, forming a "|\ |" or "inverted N" servo frame. Alternatively, a two-line servo pattern is used, for example a "V" shape (either "\ /" or "/ \"). Other patterns include two, three or more different reference and servo pattern lines 16, 17, and 18. The servo lines can also have different shapes, for example using a combination of straight, curved, arcuate or chevron-shaped segments.

In longitudinal media, servo pattern lines 16, 17, and 18 represent regions where magnetic domains in the recording layer are preferentially oriented along the plane of magnetic medium 12, for example parallel or anti-parallel to the tracking direction. In perpendicular media, the magnetic domains are preferentially oriented in an orthogonal direction with respect to the recording layer, either into or out of the plane of magnetic medium 12. Because of this preferential domain orientation, it is beneficial to erase magnetic medium 12 before writing servo pattern 10, in order to reduce residual bias and obtain a servo read signal with symmetric amplitude (that is, with equal positive and negative signal excursions).

It should be recognized that the present invention may be used with any suitable type of tape or any suitable type of media, as desired. In particular, the techniques described here are not limited to magnetic tape-based digital storage media and magnetic disc storage media, as described above. In addition, these techniques are also suitable for use with other media where reduced (e.g. perpendicular) bias may be desired, including, but not limited to, analog audio tape, analog video tape and other analog media, pattern media, and magnetoresistive storage media, e.g., for use with magnetoresistive random access memory (or MRAM) storage devices and systems.

To reduce bias in the position error signal (PES), or other signal from read head 36, the net magnetic moment (or bias) should be small in inter-pattern regions 28, so that transitions to both (e.g., perpendicular) polarity states are equally strong (that is, symmetric). Where magnetic medium 12 has a net bias (or non-zero moment), on the other hand, the transitions at servo pattern lines 16, 17, and 18 may be stronger (or enhanced) for one polarity as compared to the other. To reduce or minimize such signal bias and asymmetry effects, feedback from read head 36 is used to modify the erasure fields prior to writing servo pattern 10 on magnetic medium 12, reducing residual bias and improving symmetry in the servo signal pattern.

Figure 2:
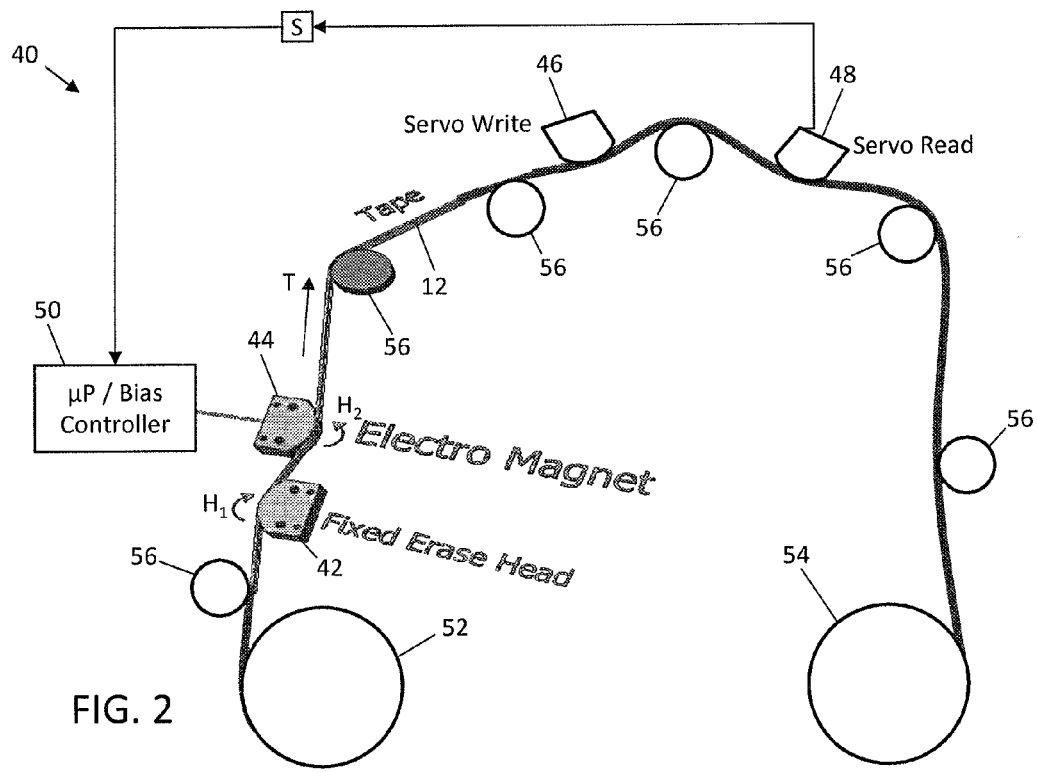
FIG. 2 is a schematic illustration of a system for reducing bias in a servo pattern.

FIG. 2 is a schematic illustration of erasure (or formatting) system 40 for reducing bias in a servo pattern, for example servo pattern 10 or other data on magnetic recording medium 12 of FIG. 1, above. In this particular example, bias-reducing system 40 comprises first magnetic head 42, second magnetic head 44, servo write head 46, servo read head 48, and controller 50. Depending on application, system 40 may also include other components for processing magnetic medium 12, including, but not limited to, tension control devices, vacuum columns, polishing and cleaning elements, and additional heads or other magnetic components for further read, write, erase, and formatting operations on magnetic medium 12.

Magnetic medium 12 propagates through system 40 along direction T (arrow), from supply reel 52 to takeup reel 54. First magnetic head (or erase head) 42 includes a fixed-field or DC magnetic field element with field strength high enough to erase magnetic medium 12.

Second magnetic head (or erase head) 44 includes a variable-field magnetic element, for example an electromagnet, in order to vary the field strength. For example, the field strength at head 44 may be determined by regulating electromagnetic coil current I via controller 50, based on feedback from read head (or PES head) 48. Depending on design, head 42 may also include an electromagnet or other variable field component, in order to adjust both field strengths.

As shown in FIG. 2, first and second heads 42 and 44 are spaced from one another along magnetic medium 12. The positions of heads 42 and 44 may also be reversed, so that magnetic medium 12 encounters either head 42 or head 44 first, followed by either head 44 or head 42. Alternatively, head 42 and head 44 may be located in substantially the same position along tracking direction T, on opposite sides of magnetic medium 12.

The orientations of heads 42 and 44 are also representative. In other designs, head 42 and head 44 are located on the same side of magnetic medium 12, either on the front side (facing the magnetic surface), or on the back side (opposite the magnetic surface). System 40 may also include additional heads or magnetic components for processing magnetic medium 12, either prior to or after writing the servo track and other data. Thus, the designations "first" and "second" are merely illustrative with respect to heads 42 and 44, and do not indicate any particular number or order of magnetic elements in position along tracking direction T, or any particular number or order of operation on magnetic medium 12.

In addition, where "first" and "second" heads may indicate at least two magnetic heads 42 and 44, any suitable number of magnetic heads or other magnetic elements may be used, in any desired positional configuration or order. For example, first (e.g., fixed-field) head 42 and second (e.g., variable-field) head 44 may be combined into a single magnetic head assembly. Alternatively, two, three or more distinct head assemblies may be utilized, with additional fixed-field or variable-field magnetic elements.

Servo (or data) write head 46 is spaced from magnetic heads 42 and 44 along tracking direction T of magnetic medium 12, for example between heads 42 and 44 and servo (or data) read head 48. Read head 48 is spaced from write head 46 along tracking direction T, for example between write head 46 and takeup reel 54. Read head 48 is connected to controller 50, in order to provide servo (or data) signal S for feedback control of variable-field magnetic head 44.

Controller 50 is connected to read head 48 and variable-field (e.g., electromagnetic) head 44. Controller 50 includes a microprocessor to determine the asymmetry of servo (or PES) signal S, or other data signal, and a variable current supply or current regulator to control coil current I, as provided to electromagnetic head 44.

Magnetic (tape) medium 12 spools off supply reel 52 and past guide roller 56 to enter the erase zone formed by first and second heads 42 and 44. Magnetic field $H_1$ at head 42 has both perpendicular and longitudinal components, providing magnetic medium 12 with longitudinal and perpendicular bias as it exits head 42. The perpendicular field component introduces a corresponding perpendicular bias in magnetic medium 12, which is oriented substantially perpendicular (or orthogonal) to the recording layer.

Thus, the perpendicular bias is directed either into or out of the plane of magnetic medium 12. This contrasts with longitudinal bias, which is directed along the plane of plane of magnetic medium 12, for example along or against tracking direction T.

As shown in FIG. 2, magnetic medium 12 has longitudinal bias pointing up (in the direction of medium motion) as it leaves head 42, and perpendicular bias directed from left to right (e.g., from the substrate up through the magnetic coating). Second (variable field) head 44 also provides an upward-oriented longitudinal bias (that is, also tracking direction T).

The perpendicular field component, however, is reversed at head 44 with respect to head 42; that is, pointing to the left in FIG. 2 (e.g., from the magnetic coating down through the substrate). Thus, head 42 and head 44 provide magnetic medium 12 with complimentary longitudinal field components and complementary longitudinal bias, but substantially opposite perpendicular field components and substantially opposite perpendicular bias, as defined with respect to the plane of magnetic medium 12.

In perpendicular magnetic media, strong longitudinal bias tends to randomize the magnetic domains, so that both heads 42 and 44 function to erase (or degauss) magnetic medium 12. Perpendicular bias, however, may persist, leaving magnetic medium 12 with a net or residual magnetization or polarization. The residual polarization depends upon the orientation and strengths of magnetic fields $H_1$ and $H_2$, as defined where magnetic medium 12 exits heads 42 and 44, respectively, and on hysteresis and other magnetic effects.

To reduce residual bias, head 44 includes an electromagnet configured to generate magnetic field $H_2$ with variable magnitude. The strength of variable field $H_2$ is determined by controller 50, allowing system 40 to reduce bias in magnetic medium 12 by adjusting coil current I as provided to (electromagnetic) head 44, counteracting the bias provided by head 42.

Controller 50 determines current I and variable field strength $H_2$ at head 44 based on feedback from read head 48. In particular, controller 50 measures the asymmetry of signal S, based on the pattern written by read head 48. Controller 50 adjusts coil current I based on the asymmetry, controlling the strength of magnetic field $H_2$ to adjust the magnitude of the perpendicular field component, in order to reduce or minimize perpendicular bias in magnetic medium 12.

That is, controller 50 determines current I based on the asymmetry of signal S, in order to provide variable-strength magnetic field $H_2$ with a magnitude selected to reduce or minimize perpendicular bias in magnetic medium 12. As a result, the positive and negative transition peaks (or excursions) experienced by read head 48 are more similar, closing the control loop for system 40 by reducing asymmetry (or increasing symmetry) in signal S.

Figure 3A:
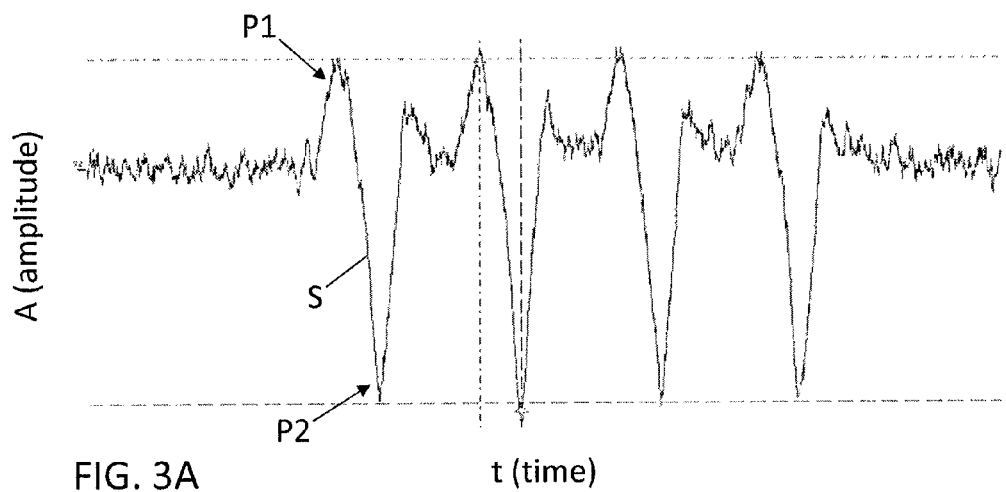
FIG. 3A is a plot of a servo or data signal with a first (e.g., positive) bias.

FIG. 3A is a plot of asymmetric servo or data signal S, with positive bias. Signal strength (amplitude) A is plotted on the vertical axis, in arbitrary units. Time (t) is plotted on the horizontal axis, also in arbitrary units.

In the particular example of FIG. 3A, second (variable field) head 44 is turned off, with no current I to the coil. Alternatively, current I is relatively low. Thus, magnetic field $H_2$ has a relatively low magnitude, "undershooting" the bias control curve so that magnetic medium 12 is left with residual (perpendicular) bias from magnetic field $H_1$.

That is, variable field head 44 does not completely remove the bias introduced by first (fixed field) head 42, before write head 46 lays down the servo or data pattern. In this positive bias example, perpendicular bias in magnetic medium 12 causes signal S to have relatively smaller amplitude positive peaks P1, as compared to the relatively larger (absolute) amplitude negative peaks P2.

Figure 3B:
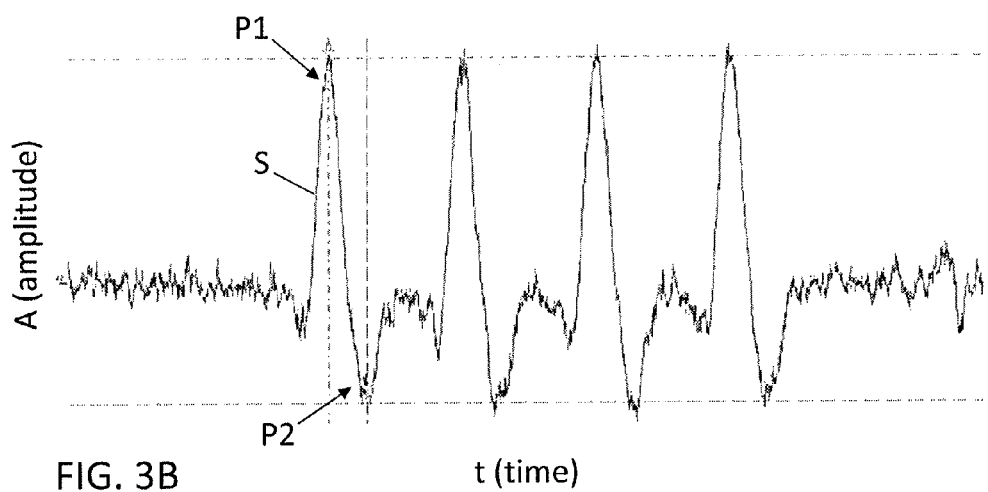
FIG. 3B is a plot of a signal with a second (e.g., negative) bias.

FIG. 3B is a plot of asymmetric servo or data signal S, with negative bias. Signal strength (amplitude) A is plotted on the vertical axis, in arbitrary units. Time (t) is plotted on the horizontal axis, also in arbitrary units.

As shown in FIG. 3B, current I to second (variable field) head 44 is relatively high, "overshooting" the bias control curve to produce an opposite (e.g., perpendicular) bias in magnetic medium 12, as compared to FIG. 3A. Signal S thus has relatively larger amplitude positive peaks P1, and relatively smaller (absolute) amplitude negative peaks P2.

The sign configuration, however, is arbitrary, depending on the signal pickup and electronics configurations of read head 48 and controller 50, and on the definition of the field direction. Thus, FIGS. 3A and 3B may be reversed, and either may be considered to describe positive or negative bias, depending on convention.

Figure 3C:
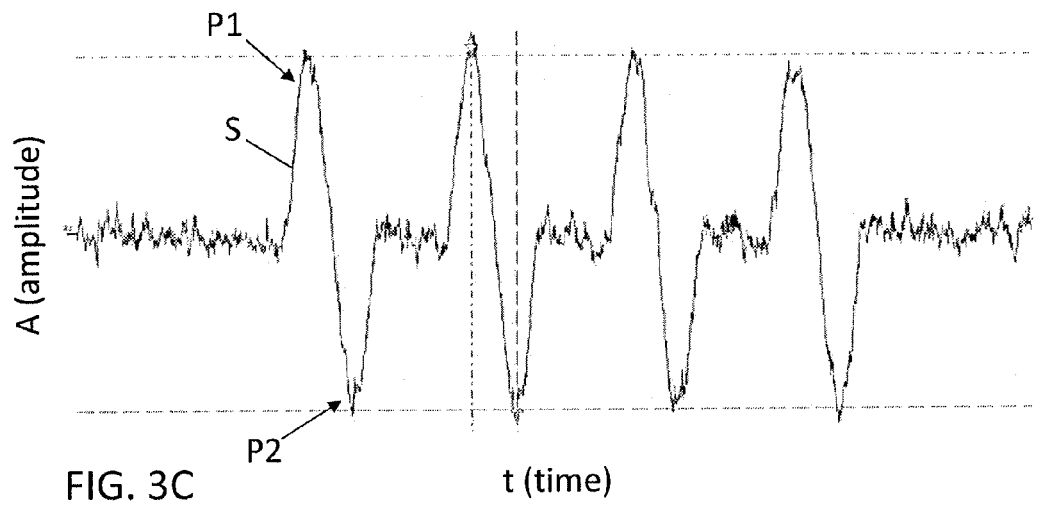
FIG. 3C is a plot of a signal with reduced bias.

FIG. 3C is a plot of symmetric signal S, with reduced or minimized bias. Signal strength (amplitude) A is plotted on the vertical axis, in arbitrary units. Time (t) is plotted on the horizontal axis, also in arbitrary units.

As shown in FIG. 3C, servo or data signal S is substantially symmetric, with relatively equal magnitude positive peaks P1, as compared to negative (absolute magnitude) peaks P2. To generate this result, controller 50 adjusts current I so that magnetic field strength $H_2$ at head 44 substantially counteracts the (perpendicular) bias introduced by magnetic field $H_1$ at head 44, without undershoot or overshoot as described above.

This technique reduces or minimizes the erase bias, so that magnetic medium 12 has relatively small or substantially no residual (perpendicular) bias entering write head 46, and so that signal S is substantially symmetric. This improves signal demodulation and timing-based head positioning, because sensitivity and response time are more uniform for both positive and negative excursions (peaks) P1 and P2. Reduced bias in magnetic medium 12 also improves read and write performance in the data bands, for more reliable data reconstruction at higher storage densities and data rates.

Figure 4:
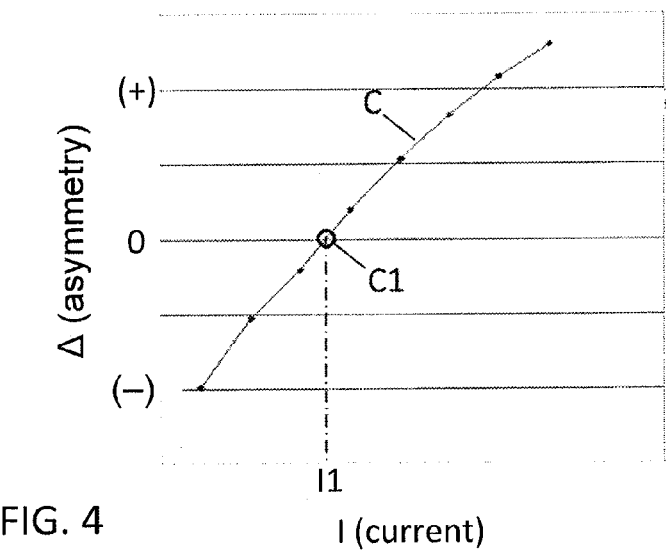
FIG. 4 is a feedback control plot for reducing bias in a servo or data signal.

FIG. 4 is a feedback control plot for reducing bias in the servo or data pattern on a magnetic recording medium, for example data pattern 10 on magnetic medium 12, as described above. The difference (or asymmetry) $\Delta$ between positive and negative (absolute) signal amplitudes is given on the vertical axis, in arbitrary units. Coil current I is given on the horizontal axis, also in arbitrary units.

As shown in FIG. 4, coil current I is determined by measuring positive (A1) and negative (A2) amplitudes of signal S, with difference (or asymmetry) $\Delta$ defined by $\Delta=|A1|-|A2|$. Control curve C is generated by determining asymmetry $\Delta$ as a function of current I, and bias is minimized by selecting the value of current I that reduces asymmetry $\Delta$ to a value close to zero; that is, the value of current I that minimizes absolute value $|\Delta|$ of asymmetry $\Delta$.

Curve C thus represents a control error function that can be used as feedback control in magnetic medium processing system 40. In particular, feedback curve C allows controller 50 to drive coil current I to adjust and control the field magnitude at head 44, in order to reduce or minimize bias in magnetic medium 12, and to reduce or minimize asymmetry and signal bias in signal S.

As shown in FIG. 4, when the value of amplitude difference (asymmetry) $\Delta$ is negative, more current (I) may be selected to reduce bias. When the value of asymmetry $\Delta$ is positive, less current (I) may be selected to reduce bias.

Alternatively, the coil configuration, field direction, or sign of current I may be reversed, and the slope of control curve C may be inverted. In this configuration, more current may be indicated when asymmetry $\Delta$ is positive, and less current may be indicated when asymmetry $\Delta$ is negative.

At (or approximately at) a particular control value C1, asymmetry $\Delta$ is minimized at a value of substantially zero. This control condition corresponds to a state of reduced or minimized perpendicular bias in magnetic medium 12.

Figure 5:
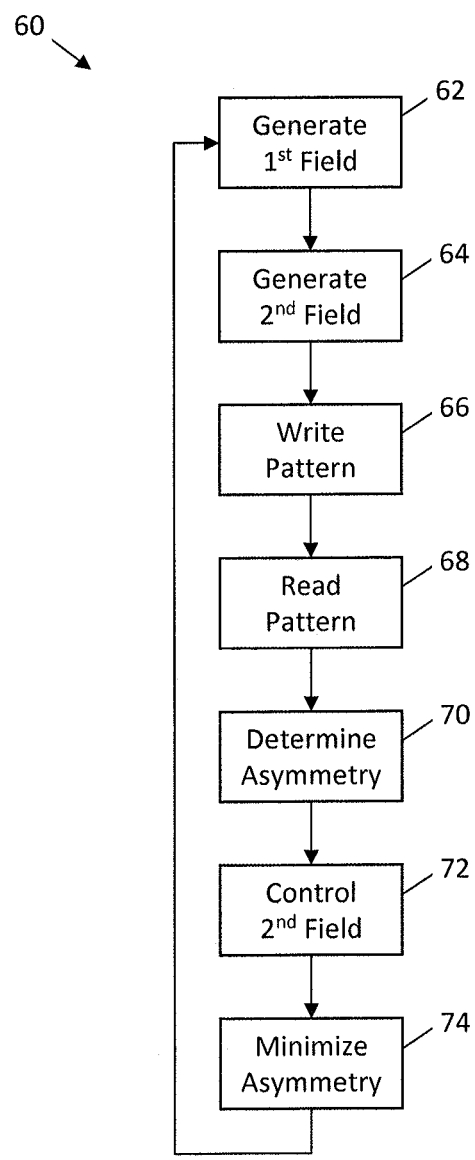
FIG. 5 is a block diagram of a method for reducing bias in a servo or data signal.

FIG. 5 is a block diagram of method 60 for reducing bias in the servo or data signal on a magnetic recording medium, for example tape-based magnetic medium 12, as described above. Method 60 includes generating a first perpendicular field component to introduce a first bias in the magnetic medium (step 62), generating a second perpendicular field component to introduce a second bias in the magnetic medium (step 64), writing a data pattern onto the magnetic medium (step 66), reading the pattern to generate a signal (step 68), and determining an asymmetry in the signal (step 70). Method 60 may also include controlling a magnitude of the second perpendicular field component (step 72), so that asymmetry of the signal is reduced or minimized (step 74), for example by reducing or minimizing perpendicular bias in the magnetic medium.

Generating a first field component (step 62) is performed with a first magnetic element, for example magnetic head 42 as described above. As the magnetic medium passes by the first magnetic element, a longitudinal bias is generated in the magnetic recording layer, tending to erase data from the medium. The first magnetic element also generates a (first) perpendicular field component, which may result in a persistent perpendicular bias.

Generating a second field component (step 64) is performed with a second magnetic element, for example electromagnetic head 44. As the magnetic medium passes by the second magnetic element, longitudinal bias is again generated. This longitudinal bias may be oriented in the same direction as in the first magnetic element, or in another direction.

The second magnetic element also generates a perpendicular field component, oriented substantially opposite to that of the first magnetic element. The magnitude of the second magnetic field is selected, adjusted or controlled to offset the residual (perpendicular) bias from the first magnetic element, reducing asymmetry in the signal.

Writing a data pattern on the magnetic medium (step 66) is performed with a write head, for example write head 46. The pattern takes a variety of forms, as described with respect to FIG. 1.

Reading the pattern (step 68) is performed by a read head, for example using read head 48 to generate signal S. The signal is characterized by positive and negative peaks, corresponding to magnetic field transitions at the leading and trailing edges of the pattern lines. When the magnetic medium is subject to residual (perpendicular) bias during the erase process, the positive and negative signal peaks may be asymmetric.

While a particular technique for reducing or minimizing amplitude asymmetry is primarily described in this application, in the context of the invention, there is no particular requirement for any such limitation. For example, it sometimes occurs that magneto-resistive (MR) and giant magneto-resistive (GMR) read heads might have amplitude asymmetry, with the effect that it might be difficult to set the asymmetry perfectly or even to within a specific tolerance. While inductive read heads can be substantially better for this purpose, they might cost more or be less readily available than MR or GMR read heads. Accordingly, in alternative embodiments, other and further techniques for reducing or minimizing amplitude asymmetry can be used.

For a first example, a method of reducing amplitude asymmetry can include determining a curve relating asymmetry to current, similar to that shown in FIG. 4, and interpolating to obtain a current that will achieve a desired asymmetry. For a second example, a method of reducing amplitude asymmetry can include measuring asymmetry at a known current, adjusting the current in a direction believed to improve the asymmetry, re-measuring the asymmetry at the new current, interpolating or extrapolating to re-adjust the current, and repeating until a satisfactory tolerance of asymmetry is reached.

Determining an asymmetry in the signal (step 70) is performed by a controller or microprocessor connected to the read head and the second magnetic element, for example controller 50. The controller determines the asymmetry in mathematical form, by comparing the positive peak amplitude or magnitude of the signal to the negative (absolute) peak amplitude or magnitude of the signal. Other measures of asymmetry may also be used, including, but not limited to, measures based on a moment of the signal peak distributions, such as a mean, variance, skewness, or kurtosis.

Controlling a magnitude of the second perpendicular bias (step 72) may also be performed by the controller or microprocessor, for example using controller 50 to adjust coil current I as provided to second (variable-field) electromagnetic head 42. Alternatively, an independent current regulator is used, with a control signal from controller 50.

To reduce perpendicular bias, current I is increased or decreased to reduce asymmetry in the signal, for example based on control curve C of FIG. 4. In particular, current I may be selected so that perpendicular bias and signal asymmetry are reduced or minimized (step 74), in order to improve data storage and retrieval performance.

In the foregoing description, various embodiments of the invention have been presented for the purpose of illustration and description. They are not intended to be exhaustive or to limit the invention to the precise form disclosed. Obvious modifications or variations are possible in light of the above teachings. The embodiments were chosen and described to provide the best illustration of the principals of the invention and its practical application, and to enable one of ordinary skill in the art to utilize the invention in various embodiments and with various modifications as are suited to the particular use contemplated. All such modifications and variations are within the scope of the invention as determined by the appended claims when interpreted in accordance with the breadth they are fairly, legally, and equitably entitled.

The invention claimed is:

1. A method comprising:
generating a first magnetic field component in a magnetic medium;
generating a second magnetic field component in the magnetic medium, substantially opposite the first magnetic field component;
writing a pattern onto the magnetic medium;
generating a signal by reading the pattern from the magnetic medium;
determining an asymmetry in the signal; and
controlling a magnitude of the second magnetic field component based on the asymmetry.

2. The method of claim 1, wherein determining an asymmetry in the signal comprises comparing a positive peak amplitude in a servo signal to a negative peak amplitude in the servo signal.

3. The method of claim 2, wherein controlling a magnitude of the second field component comprises controlling the magnitude to reduce the asymmetry.

4. The method of claim 1, wherein generating the first field component comprises generating a fixed field component with a fixed-field magnetic head.

5. The method of claim 4, wherein generating the second field component comprises generating a variable field component with an electromagnetic head.

6. The method of claim 5, wherein controlling a magnitude of the second field component comprises adjusting a current supply to the electromagnetic head.

7. A magnetic tape formatted according to the method of claim 1.

8. The magnetic tape of claim 7, further comprising a recording layer configured for perpendicular recording.

9. The magnetic tape of claim 8, wherein the recording layer comprises barium ferrite.

10. The magnetic tape of claim 8, wherein the first and second field components are oriented substantially perpendicular to the recording layer.

11. The magnetic tape of claim 10, wherein controlling a magnitude of the second field component comprises controlling the magnitude to reduce or minimize perpendicular bias in the recording layer.

12. A system comprising:
first and second magnetic heads positioned along a magnetic medium, the first and second magnetic heads configured to generate first and second substantially opposite magnetic field components in the magnetic medium;

a write head positioned along the magnetic medium, the write head configured to write a pattern onto the magnetic medium;

a read head positioned along the magnetic medium, the read head configured to generate a signal by reading the pattern; and a controller connected to the read head and the second magnetic head, the controller configured to control a magnitude of the second magnetic field component based on an asymmetry of the signal.

13. The system of claim 12, wherein the magnetic medium comprises a perpendicular recording layer.

14. The system of claim 13, wherein the first and second magnetic field components are oriented substantially perpendicular to the recording layer.

15. The system of claim 13, wherein the perpendicular recording layer comprises barium ferrite.

16. The system of claim 12, wherein the first and second magnetic heads are spaced apart from one another along the magnetic medium.

17. The system of claim 12, wherein the second magnetic head comprises an electromagnet.

18. The system of claim 17, wherein the controller is configured to control the magnitude of the second magnetic field component by adjusting a coil current to the electromagnet.

19. The system of claim 17, wherein the controller is configured to reduce or minimize the asymmetry of a servo signal by increasing or decreasing the coil current.

20. The system of claim 17, wherein the controller is configured to reduce or minimize perpendicular bias in the magnetic medium by increasing or decreasing the coil current.

* * * * *